United States Patent [19]

Marks et al.

[11] Patent Number: 5,502,017

[45] Date of Patent: Mar. 26, 1996

[54] METALLOCENE CATALYST CONTAINING BULKY ORGANIC GROUP

[75] Inventors: Tobin J. Marks, Evanston; Li Ja, Chicago; Xinmin Yang, Evanston, all of Ill.

[73] Assignee: Northwestern University, Evanston, Ill.

[21] Appl. No.: 209,669

[22] Filed: Mar. 10, 1994

[51] Int. Cl.⁶ .................................................. B01J 31/14
[52] U.S. Cl. ........................... 502/103; 502/117; 502/154
[58] Field of Search .................................... 502/117, 103, 502/154

[56] References Cited

U.S. PATENT DOCUMENTS 5,153,157  10/1992  Hlatky et al. ............................ 502/117
5,296,433  4/1992  Siedle et al. ............................ 502/117
5,387,568  2/1995  Ewen et al. ............................ 502/104

FOREIGN PATENT DOCUMENTS 0277003  1/1988  European Pat. Off. . .
0277004  1/1988  European Pat. Off. . .

*Primary Examiner*—E. Rollins Cross
*Assistant Examiner*—Timothy H. Meeks
*Attorney, Agent, or Firm*—Richard P. Fennelly; Louis A. Morris

[57] ABSTRACT

An ionic metallocene catalyst for olefin polymerization which comprises: (1) a cyclopentadienyl-type ligand, a Group IVB transition metal, and alkyl, aryl, or hydride substituents, as a cation, and (2) a weakly coordinating anion comprising boron substituted with halogenated, such as tetra fluoro, aryl substituents preferably containing silylalkyl substitution, such as para-silyl t-butyldimethyl.

9 Claims, No Drawings

METALLOCENE CATALYST CONTAINING BULKY ORGANIC GROUP

This invention was made with Government support under Contract No. 86ER 13511 awarded by the Department of Energy. The Government has certain rights in this invention.

BACKGROUND OF THE INVENTION

Metallocene cationic salts of the general type $Cp_2MR^+X^-$ (Cp being a cyclopentadienyl-type ligand; M being a Group IVB metal such as titanium, zirconium, or hafnium, R being alkyl, aryl or hydride; and X being a weakly coordinating anion form the basis for a large family of active, efficient and selective olefin polymerization catalysts. The performance of these systems is exceedingly sensitive to the nature of $X^-$ with $X^-$ being, preferably, $RMAQ^-$ (MAO being methylaluminoxane), $RB(C_6F_5)_3^-$, and $B(C_6F_5)_4^-$. While $B(C_6F_5)_4^-$ appears to give the most active catalysts, such catalysts suffer from insolubility and thermal instability.

U.S. Pat. No. 5,153,157 to G. G. Hlatky et al. discloses catalyst systems in which the anion is said to be bulky, labile and non-coordinateable with the Group IV metallocene containing component. Despite a rather generalized disclosure of possible substitution possibilities on the aromatic hydrocarbon groups of the anion, this patent only exemplifies the use of tetraphenyl borate and tetrapentafluorophenyl borate species without any suggestion that the presence of certain types of substitution on these structures would yield systems having enhanced solubility and thermal stability characteristics. There is, furthermore, no enabling description as to how such enhanced systems might be made.

DESCRIPTION OF THE INVENTION

The present invention relates to a modification of the aforementioned type of catalyst systems by providing a weakly coordinating anion comprising boron substituted with halogenated aryl substituents containing silylalkyl substitution. The presence of silylalkyl substitution on the aryl moiety, preferably in the para-position increases the solubility and thermal stability of the resulting metallocene salts.

It is within the contemplation of the present invention that a variety of general boron-containing structures can be employed in accordance with the present invention. For example, boron tetraaryl structures in which the four aryl groups are phenyl containing four fluorine substituents and a bulky "R" group in the ortho, meta or para-position to increase the solubility and thermal stability of the catalyst system are contemplated herein. Representative R groups include $C_1$ to $C_{20}$ alkyl or $C_1$ to $C_{20}$ alkyl-substituted group 14 metalloids (e.g., silicon, germanium, or tin). Also contemplated are analogous boron species where the aryl moiety can comprise a biphenylene structure in which the phenyl ring closest to the boron atom contains four fluorine substituents with the more remote phenyl ring containing four fluorine substituents and the type of R group defined above. If desired, the biphenylene configuration of the aryl substituents can be reconfigured to a naphthyl configuration with the same type of R group being used to improve the solubility and thermal stability of the catalyst that results as compared to one not containing the bulky R substituent.

The silylalkyl substitution, which represents a preferred embodiment herein, is of the structure with $R^I$ being the same or different and being selected from straight and branched alkyl, preferably lower alkyl of from one to four carbon atoms. Representative alkyl groups include methyl, ethyl and t-butyl. A particularly preferred silyl substituent comprises one t-butyl and two methyl groups in aryl substituents also containing four fluorine atoms. The thermal stability for such a system is significant since it has been found stable with no significant thermal decomposition to 100° C. over a period of hours. In contrast, the known system

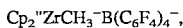

Cp" being 1,2-dimethylcyclopentadienyl) is only stable below 0° C. for significant periods of time.

The general type of procedure for making the desired metallocene catalyst of the present invention can be practiced by using the general type of procedure disclosed in Examples 1–4, below, which depict the synthesis of a particularly preferred embodiment of the invention.

Initially, a precursor for the anion can be formed, for example, by reaction of a halogenated benzene analog of the ultimately desired, non-silyl substituted structure, a suitable metallating agent, such as an alkyl lithium reagent, and a silylalkyl trifluoromethane sulfonate. The resulting reaction forms the desired silylalkyl-substituted halogenated benzene precursor for the subsequent step in which such a precursor is reacted with a suitable metallating agent, such as an alkyllithium reagent, and boron trihalide to form a lithium and borate-containing salt species which is in turn reacted with triphenylmethyl chloride to form the triphenyl carbenium precursor. This resulting precursor can be reacted with a selected bis(cyclopentadienyl) zirconocene reagent to form the ultimately desired catalyst salt.

If desired, the catalyst salt can be generated in-situ by mixing the desired metallocene (e.g., $Cp_2Zr(CH_3)_2$) and boron-containing reagent (e.g., $B(R)_3$, where R is preferably a silyl-substituted tetrafluorophenyl group) just prior to polymerization.

The Examples which follow set forth certain embodiments of the present invention.

EXAMPLE 1

Synthesis of 1-(Dimethyl-t-Butylsilyl)-2,3,5,6-Tetrafluorobenzene ($C_6HF_4TBS$; TBS=t-butyl, dimethylsilyl)

The compound, 1-bromo-2,3,5,6-tetrafluorobenzene, $C_6HBrF_4$, (14.8 g, 64.6 mmol) was dissolved in diethyl ether (200 ml) in a 500 ml flask and was cooled down to −78° C. Butyllithium (40 ml, 1.6M in hexanes) was then added to the flask dropwise while the solution was being stirred vigorously. After it had been stirred for one hour, t-butyldimethylsilyl trifluoromethane sulfonate (17.0 g, 64.6 mmol) was injected via a syringe. The reaction mixture was allowed to slowly warm up to room temperature over a period of eight hours, and the resulting suspension was filtered. After the solvent was removed from the filtrate at 25° C. under reduced pressure, the nonvolatile residue was distilled and a colorless liquid product was collected (45°C./0.8 mm Hg). Yield, 80%, $^1H$ NMR($CCl_2D_2$): δ0.40 (t, 6H), 0.93 (s, 9H), 7.10 (m, 1H); $^{13}C$ NMR($CCl_2D_2$): δ–3.7(t), 18.1(s), 26.5(s), 108.0(t), 144.8(m), 148.1(t), 151.4(t).

EXAMPLE 2

Synthesis of Bis (Diethyl Ether) Lithium Tetrakis-(4-Dimethyl-t-Butylsilyl- 2,3,5,6,-Tetrafluorophenyl) Borate $[(Et_2O)_2Li]^+[B(C_6F_4TBS)_4]^-$ The compound synthesized in Example 1, namely, 1-(dimethyl-t-butylsilyl)-2,3,5,6-tetrafluorobenzene, (5.4 g, 20.4 mmol) was dissolved in diethyl ether (100 ml) in a 250 ml flask and was cooled down to −78° C. Butyllithium (13 ml, 1.6M in hexanes) was then added into the flask dropwise while the solution was being stirred vigorously. After it had been stirred for two hours, boron trichloride (4.2 ml, 1.0M in hexanes) was injected via a syringe. The reaction mixture was allowed to slowly warm up to room temperature over a period of eight hours, and the resulting suspension was filtered. The volume of the solution was reduced to 50 ml and then pentane (130 ml) was layered on top of it. The product was collected as large colorless crystals after pentane was allowed to diffuse into the solution over twenty-four hours, followed by filtration. Yield, 74%. $^1$H NMR($C_6D_6$): δ0.20 (s, 24H), 0.80 (m, 12H), 0.82 (s, 36H), 3.05 (q, 8H); $^{19}$F NMR($C_6D_6$): δ−129.4(b), −133.8(b).

EXAMPLE 3

Synthesis of Triphenylcarbenium Tetrakis (4-Dimethyl-t-Butylsilyl)-2,3,5,6-Tetrafluorophenyl) Borate $[(C_6H_5)_3C]^-[B(C_6F_4TBS)_4]^-$ The bis(diethyl ether)lithium tetrakis-4-(dimethyl-t-butylsilyl)- 2,3,5,6,-tetrafluorophenyl) borate synthesized in Example 2 (3.8 g, 3.1 mmol) and triphenylmethyl chloride (0.88 g, 3.1 mmol) were loaded in a 200 ml flask. As pentane (100 ml) was injected into the flask, the reaction mixture turned orange immediately. The slurry was stirred for four hours at room temperature and was then filtered. The orange solid was collected and was placed in another 200 ml flask in which $CH_2Cl_2$(100 ml) was added. The solution was filtered through to remove lithium chloride, and then the volume of the filtrate was reduced to 50 ml. Pentane (100 ml) was added at this point to precipitate an orange solid. The product was washed with pentane (50 ml) again. Yield, 86%. $^1$H NMR($CCl_2D_2$): δ0.31 (s, 24H), 0.88 (s, 36H), 7.64 (d, 6H), 7.85 (t, 6H), 8.25 (t, 3H); $^{19}$F NMR($CCl_2D_2$): δ−133.0(b), −144.5(b); $^{13}$C NMR($CCl_2D_2$): δ−3.8(s), 17.8(s), 26.4(s), 108.4(s), 131.0(s), 140.2(s), 143.0(s), 144.0(s), 147.4(m), 149.6(m), 211.3(s). Anal. Calcd.: C, 61.55; H, 5.78; N, 0.00. Found: C, 61.83; H, 5.61; N, 0.00.

EXAMPLE 4

Synthesis of Bis (1,2-Dimethylcyclopentadienyl) Methyl Zirconium (I) Tetrakis(4-Dimethyl-t-Butylsilyl-2,3,5,6-Tetrafluorophenyl) Borate $[Cp"_2ZrCH_3]^+[B(C_6F_4TBS)_4]^-$ (Cp"=1,2-dimethylcyclopentadienyl)

The triphenylcarbenium tetrakis[(4-dimethyl-t-butylsilyl)-t-butyl- 2,3,5,6-tetrafluorophenyl]borate synthesized in Example 3 (390 mg, 0.30 mmol) and bis(1,2-dimethylcyclopentadiene) zirconocene dimethyl (100 mg, 0.32 mmol) were loaded in a 25 ml flask. Toluene (15 ml) was vacuum-transferred into the flask at −78° C. The mixture was then warmed up to room temperature and was stirred for one hour. The resulting pale yellow solution was filtered and the volume of the solution was reduced to 5 ml. Then, pentane (15 ml) was vacuum-transferred into the flask to precipitate the product. The pale yellow product was collected after filtration. Yield, 75%. One thing that is worth mentioning is the outstanding thermal stability of this type of compounds with the anion applied in this patent among all those with other anions. The compound was stable at 100° C. for a minimum of two hours and no decomposition was observed by NMR. $^1$H NMR($C_6D_6$): δ0.21 (s, 24H), 0.34 (s, 3H), 0.83 (s, 36H), 1.37 (s, 6H), 1.61 (s, 6H), 5.00 (b, 2H), 5.69 (b, 2H), 5.97 (t, 2H); $^{19}$F NMR($C_6D_6$) at 60° C.: δ−129.6(b), −131.0(b); $^{13}$C NMR($C_6D_6$): δ−3.9(s), 12.5(s), 17.7(s), 26.4(s), 45.9(s), 108.1(s), 110.1(m), 111.8(s), 119.8(s), 133.5(b), 147.7(m), 150.9(m). Anal. Calcd.: C, 55.78; H, 6.02; N, 0.00. Found: C, 55.56; H, 6.01; N, 0.00.

EXAMPLE 5

Polymerization of ethylene

Bis(1,2-dimethylcyclopentadienyl) methyl zirconium (I) tetrakis[(4-dimethyl-t-butylsilyl-2,3,5,6-tetrafluorophenyl) borate synthesized in Example 4 (15 mg) was dissolved in toluene (3 ml) in a gas-tight vial in the glove-box. In the meantime, toluene (50 ml) was loaded in a 100 ml flask in the glove-box. The flask was then connected to a vacuum-line and was presaturated with 1.0 atmosphere of ethylene. With ethylene continuing bubbling and the toluene being stirred vigorously, two-thirds of the aforementioned solution of the catalyst was injected into the flask. The reaction could not be stirred in ten seconds due to the production of a large amount of polyethylene. It was quenched by methanol. A yield amount of 0.23 g of polyethylene was obtained. The polymer was collected by filtration and was dried under high vacuum.

EXAMPLE 6

Polymerization of propylene

Bis(1,2-dimethylcyclopentadienyl) methyl zirconium (I) tetrakis[(4-dimethyl-t-butylsilyl)-2,3,5,6-tetrafluorophenyl] borate synthesized in Example 4 (15 mg) was loaded in a 100 ml flask in the glove-box. Toluene (50 ml) was vacuum-transferred into the above flask and the solution was exposed to one atmosphere propylene at the room temperature while being stirred vigorously. After being stirred for one-half hour, the reaction was quenched by methanol. A yield of 6.5 g of polypropylene was obtained.

The foregoing Examples, which are presented herein for illustrative purposes only, should not be construed in a limiting sense for that reason. The scope of protection sought is set forth in the claims which follow.

We claim:

1. An ionic metallocene catalyst for olefin polymerization which comprises: (1) a cyclopentadienyl ligand, a Group IVB transition metal, and alkyl, aryl, or hydride substituents, as a cation, and (2) a weakly coordinating anion comprising boron substituted with four halogenated aryl substituents each containing a bulky organic substituent to improve the solubility and thermal stability of the catalyst as compared to a catalyst containing tetrakis (pentafluorophenyl) boron as the anion.

2. A catalyst as claimed in claim 1 wherein the aryl substituent in the anion (2) is selected from the group consisting of a phenyl, biphenyl, and naphthyl configuration.

3. A catalyst as claimed in claim 1 wherein the bulky organic substituent is selected from the group consisting of $C_1$ to $C_{20}$ alkyl and $C_1$ to $C_{20}$ alkyl-substituted group 14 metalloids.

4. A catalyst as claimed in claim 1 wherein the bulky organic substituent is an alkyl substituted silyl atom.

5. A catalyst as claimed in claim 1 wherein the substitution on the halogenated aryl substituents is silyl t-butyldimethyl.

6. A catalyst as claimed in claim 5 wherein the substitution is para- on the halogenated aryl substituents.

7. A catalyst as claimed in claim 1 wherein the aryl substituents contain four fluoro substituents.

8. A catalyst as claimed in claim 5 wherein the aryl substituents contain four fluoro substituents.

9. A catalyst as claimed in claim 6 wherein the aryl substituents contain four fluoro substituents.

* * * * *